Sept. 6, 1932.   A. I. DUNN   1,876,280
MEASURING DEVICE
Filed June 13, 1929
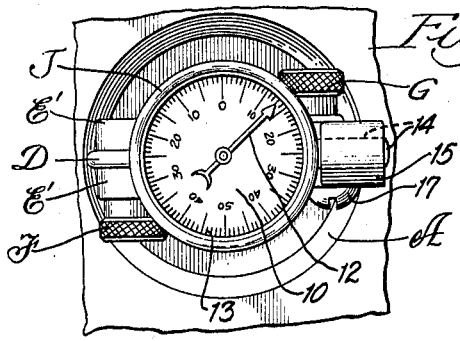
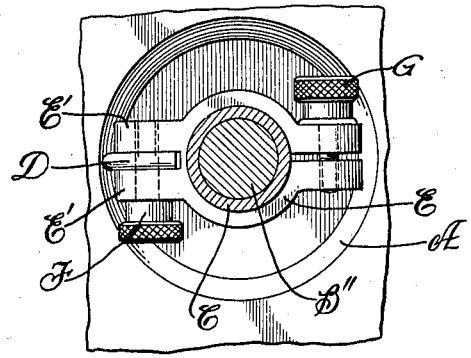
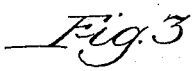
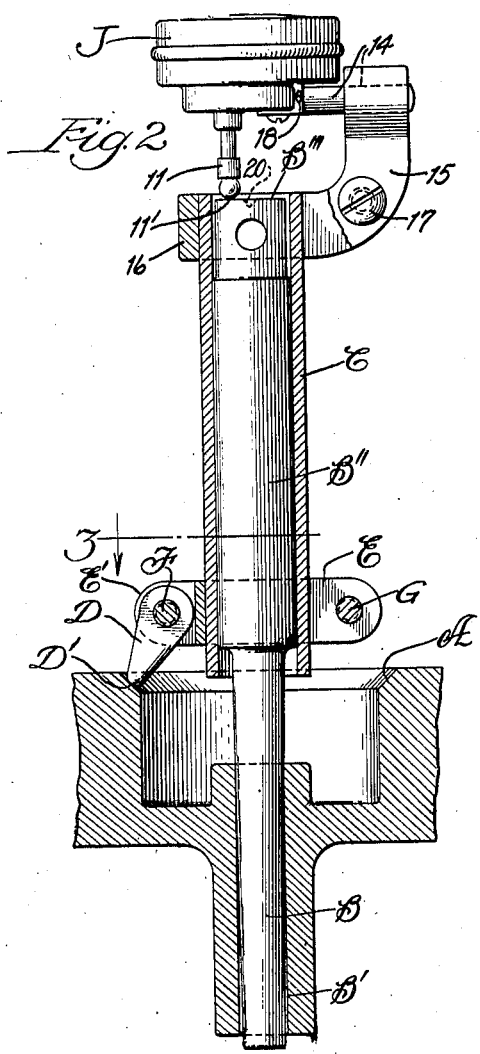
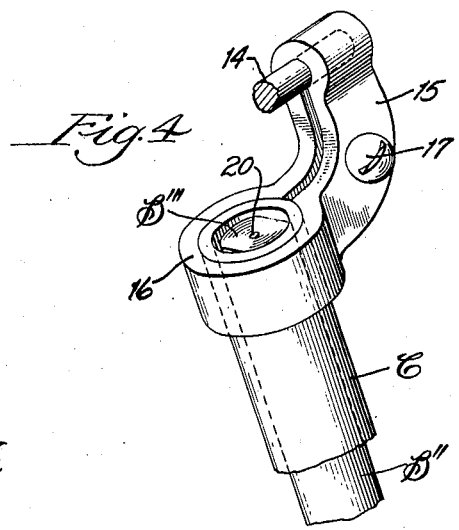
Inventor:
Allen I. Dunn,
Attys.

Patented Sept. 6, 1932

1,876,280

UNITED STATES PATENT OFFICE

ALLEN I. DUNN, OF CEDAR RAPIDS, IOWA, ASSIGNOR TO CEDAR RAPIDS ENGINEERING COMPANY, OF CEDAR RAPIDS, IOWA, A CORPORATION OF IOWA

MEASURING DEVICE

Application filed June 13, 1929. Serial No. 370,706.

This invention relates to improvements in measuring devices and, more especially, such a device particularly adapted for measuring, indicating, or detecting any deformity, eccentricity, irregularity, or unevenness in a valve seat. As an example, the invention is shown as applied to a device particularly adapted for use in connection with a valve seat arranged above or adjacent to a co-operating valve stem guide. For example, the invention is particularly adapted for use in connection with the valve seats of internal combustion engines as now commonly used in motor vehicles.

My improved measuring device is simple in construction, easy to operate, and very exact and true.

Other features and advantages of my invention will appear more fully as I proceed with my specification.

In that form of device embodying the features of my invention shown in the accompanying drawing—

Figure 1 is a top plan view; Fig. 2 is a view partly in side elevation and partly in vertical section; Fig. 3 is a view taken as indicated by the line 3 of Fig. 2; and Fig. 4 is a view in perspective of a part of the device.

As shown in the drawing, a valve seat, for example the valve seat in an internal combustion engine, is indicated by A, B' indicating the co-operating valve stem guide arranged below the seat. This seat and valve stem guide are of conventional or typical construction as commonly used in internal combustion engines.

B indicates a pilot adapted to be inserted in the valve stem guide. Any suitable means may be provided for rigidly mounting the pilot in the guide. For example, the lower end of the pilot may be made with a very long slight gradual taper so that it may be pushed into the guide and wedged therein in a rigid position. It is obvious, however, that other means may be provided for mounting the pilot in the valve stem guide. For example, there are pilots of known construction with expansible lower ends or other parts. One of these pilots could be used in place of the one that I have shown with a taper. I believe, however, that the use of a pilot with a tapered end is satisfactory in this device.

It may not be amiss to explain how I contemplate holding the pilot rigidly in a straight hole. I believe the tight fit of a tapered pilot in the straight valve guide hole is perfectly possible and practical because of the fact that the materials in the valve stem guide and in the pilot are, to a certain extent, compressible. The metal in the upper part of the guide is compressed outwardly and that in the upper part of the tapered end of the pilot, which fits in the guide, is compressed inwardly. The force necessary to accomplish this compression is due to the very powerful wedging effect of the long slim gradual taper on the lower end of the pilot. The taper, for example, may be less than one thousandth of an inch per inch. In operation, the tapered lower end of the pilot B is forced down into the valve stem guide until it wedges or seats firmly. This part of the pilot will have to be of the proper size for the particular valve stem guide in which it is used; and, consequently, assorted sizes of pilots may be necessary for use on different motors. After the pilot is once put in position, it is held stationary and rigid and properly centered.

The upper portion of the pilot B, as indicated by B", is preferably larger than the lower portion and is ground straight and concentric with the lower portion.

C indicates a long straight sleeve which fits snugly but rotatably and slidably over the upper portion of the pilot. This sleeve carries a small finger D adjustably mounted thereon. I have here shown the mounting for the finger as including a split holder or collar E, the ends of which may be drawn together by the knurled thumb screw G in order to clamp the collar E in any desired position on the sleeve C. The collar E is provided with parallel jaws E' between which the finger D is mounted on the thumb screw F. The finger D may be rotated on the thumb screw F and locked in any position by tightening said thumb screw to clamp the finger D between the jaws E', E'. The collar E may be locked in any position on the sleeve C by means of the thumb screw G. By this means, the finger D can be adjusted so that its lower rounded end D' can be brought into contact with the surface of any valve seat at any point. By raising or lowering the collar E and swinging the finger D on the pivot F, the finger may be adjusted for different sizes of valve seats and for different positions that the pilot B might assume. That is, since the lower end of the pilot B is tapered, it may assume different heights in different valve stem guides. Variations in the size of the guide in different motors will cause variations in the height at which the pilot will seat itself in the guide. By means of the two screws F and G, the lower end of the finger D may be adjusted so that it will ride on the valve seat after the pilot is mounted in the guide.

The upper end of the pilot B, as indicated by B''', is ground off square and true. Mounted on the upper end of the sleeve C is a suitable surface gage, indicated, in general, by J, the details of which form no part of the present invention. For example, this surface gage may be similar to a micrometer of the dial type. It will suffice to say that I have here shown, for this purpose, a measuring instrument with an upwardly facing indicating dial 10 and a downwardly projecting feeler 11 having a lower rounded end 11'. The interior of the measuring instrument J is so constructed that up and down movements of the feeler 11 will be indicated, measured and amplified by rotary movement of the arrow or pointer 12. The dial 10 may be suitably calibrated, as indicated by 13. The measuring instrument J is mounted on a rod 14 carried by a bracket 15 which is clamped on the upper end of the sleeve C in any suitable manner. For example, the bracket 15 may be provided with a collar 16 surrounding the sleeve C, said collar adapted to be constricted by means of the screw 17. The measuring instrument J may be adjustably mounted on the rod 14 by means of a set screw 18.

The operation of the measuring device is as follows. The pilot is first inserted in the valve stem guide and securely wedged in place. The finger D is then adjusted by means of the screws F and G so that the rounded point of the finger is in contact with the valve seat A. The finger carrier C may be adjusted upwardly or downwardly so that when the finger D is in proper contact, the pointer 12 of the dial indicator J will be the desired position on the scale. The instrument J is also adjusted on the rod 14 so that the ball 11' on the lower end of the feeler 11 will describe a circle on the face B''' when the carrier C is rotated. This circle should be as small as practical without danger of the lower end of the feeler running into the center hole 20 in the end face B''' of the pilot B. After the device is thus set, rotation of the sleeve C or finger carrier will cause the same to move around on the valve seat. Any deformities in the valve seat will cause the sleeve C to be raised or lowered on the pilot B'' and this raising or lowering will be indicated on the dial of the measuring instrument J. It will be seen that this instrument measures or indicates the vertical variations in the valve seat. This, however, will indicate any deformity or variation in any valve seat cut at an angle. In the case of valve seats cut at substantially an angle of 45°, it will be seen that the instrument also measures the eccentricity, because in such valve seats, the vertical error is the same as the horizontal error, and the latter causes an eccentricity.

It is to be especially noted that the finger D is easily adjustable, either horizontally or vertically, to accommodate all conditions. The mounting collar E for the finger D is small and compact so as not to obstruct the vision of the valve seat A when the instrument is being used and also to permit the use of the instrument on valve seats where the space is limited due to studs projecting from the upper part of the cylinder block, and the like. The dial indicator is directly on top of the device, which not only lends a neat, attractive appearance, but also affords a maximum convenience in reading the same.

The device measures accurately the vertical variations or deformities in the valve seat which is the most important thing to be known, since it is this inaccuracy which shows the exact distance which a perfectly faced valve with an accurate stem would be held away from the low side of the valve seat by its high side.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. A device for indicating the deformity of a valve seat arranged above a co-operating valve stem guide, said device comprising; an elongated pilot adapted to be rigidly mounted in the guide with its upper end projecting above the guide; a finger carrier rotatably and slidably mounted on the upper end portion of the pilot; a finger mounted on the finger carrier and adapted to be placed in contact with the valve seat; and means controlled by the finger carrier for indicating the vertical movements of the latter on the pilot as said finger carrier is rotated with the finger in contact with the valve seat.

2. A device for indicating the deformity of a valve seat arranged above a co-operating valve stem guide, said device comprising; an elongated pilot adapted to be rigidly mounted in the guide with its upper end projecting above the guide; a finger carrier movably mounted on the upper end portion of the pilot; a finger mounted on the finger carrier and adapted to be placed in contact with the valve seat; and means supported by the finger carrier for indicating the vertical movements of the finger as said finger carrier is rotated with the finger in contact with the valve seat.

3. A device for indicating the deformity of a valve seat arranged above a co-operating valve stem guide, said device comprising; an elongated pilot adapted to be rigidly mounted in the guide with its upper end projecting above the guide; a finger adapted to be placed in contact with the valve seat; means movably mounted on the upper end portion of the pilot for supporting said finger in contact with the valve seat and moving the finger along the valve seat while the finger is in contact with said valve seat, said means permitting vertical movements of the finger; and means supported by said first-named means for indicating the vertical movements of the finger as the same is moved in contact with the valve seat.

4. A device for indicating the deformity of a valve seat arranged above a cooperating valve stem, said device comprising; an elongated pilot adapted to be rigidly mounted in the guide with its upper end projecting above the guide; a finger carrier movably mounted on the upper end portion of the pilot; a finger mounted on the finger carrier and adapted to be placed in contact with the valve seat; and means controlled by the finger carrier for indicating the vertical movements of the finger as said finger carrier is rotated with the finger in contact with the valve seat.

In witness whereof, I have hereunto set my hand this 7th day of June, 1929.

ALLEN I. DUNN.